United States Patent [19]

Hotaling

[11] Patent Number: 5,260,962

[45] Date of Patent: Nov. 9, 1993

[54] COMPACT LIGHTWEIGHT RING LASER GYRO

[75] Inventor: Steven P. Hotaling, Liverpool, N.Y.

[73] Assignee: The United States of America as represented by the Secretary of the Air Force, Washington, D.C.

[21] Appl. No.: 894,507

[22] Filed: May 29, 1992

[51] Int. Cl.⁵ .................. H01S 3/083; G01C 19/64
[52] U.S. Cl. .................................. 372/94; 356/350
[58] Field of Search ......................... 372/94; 356/350

[56] References Cited

U.S. PATENT DOCUMENTS

| Re. 32,107 | 4/1986 | January | 501/12 |
|---|---|---|---|
| 4,028,085 | 6/1977 | Thomas | 65/134 |
| 4,681,615 | 7/1987 | Toki et al. | 65/18.1 |
| 4,717,773 | 1/1988 | Kenney et al. | 556/457 |
| 4,795,258 | 1/1989 | Martin | 372/94 |
| 4,813,774 | 3/1989 | Dorschner et al. | 372/94 |
| 4,837,774 | 6/1989 | Jabr et al. | 372/94 |
| 4,839,903 | 6/1989 | Simms et al. | 372/94 |
| 5,004,343 | 4/1991 | Dorschner et al. | 356/350 |
| 5,136,608 | 8/1992 | Bernard et al. | 372/94 |

Primary Examiner—Georgia Y. Epps
Attorney, Agent, or Firm—Thomas C. Stover; Donald J. Singer

[57] ABSTRACT

A lightweight ring laser gyro (RLG) for vehicles including space vehicles is provided wherein the housing of such RLG, instead of being made of relatively heavy ULE glass, is made of low density silica aerogel having a density of from 600 to 1000 mg/cc. Further, where the prior art RLGs have three laser triangles, each mounted in one of three blocks, which blocks are mounted on separate orthogonal sides of a housing, the RLG of the present invention employs but one block with all three laser triangles orthogonally machined therein for a considerable size reduction or compactness and a further weight savings. The RLG of the invention can be attached to, e.g. space vehicles, including satellites for guidance and monitoring thereof. Also, the substrates of mirrors mounted on such RLG can also be made of LD aerogels for a further weight savings not seen in the prior art.

15 Claims, 4 Drawing Sheets

COMPACT LIGHTWEIGHT RING LASER GYRO

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a lightweight ring laser gyro, particularly one mounted in an aerogel housing.

2. Prior Art

Currently, in prior art ring laser gyros (RLGs) frame and mirror material design, ultra low expansion (ULE) glass or glass ceramic is employed. Ring laser gyros (RLGs) are used for measuring rotation in inertial space about the input axis. When combined with three accelerometers, such three-axis RLG yields an inertial sensor assembly which may be directly applied to navigation, guidance and control systems for vehicles and positioning systems, eg. for oil drilling bits. Such materials have densities of approximately 2200 mg/cc.

Such prior art RLGs employ laser beams in a Sagnac interferometer (SIF) to count fringe lines and translate rotational movement into angular displacement by means known in the art. A typical small prior art three-axis system 10 is shown in FIG. 1. The prior art system uses three relatively heavy ULE glass blocks, 12, 14 and 16 mounted on separate sides of a rectangular housing 18, per FIG. 1, which blocks are positioned as orthogonal planes on the x,y and z axes. Each block has a triangular laser path 20 (more fully discussed below) cut therein to measure rotation of a body (to which it is mounted) on one of the above three axes.

That is, the y axis, for example, is the input axis to laser triangle 20 of block 14, as shown in FIG. 1. The input axis is a mathematical construct, orthognal to the plane of such laser triangle as further discussed below. Angle readings from the three glass blocks give a combined reading of the rotation of such body (eg. a vehicle) on all three axes. Such prior art RLG is relatively large, cumbersome and heavy which limits the size and/or number thereof according to launch payload constraints for, e.g. space vehicles. Accordingly, there is need and market for lighter weight RLG systems than have been previously available.

There has now been discovered a light-weight system of greatly reduced weight and in certain embodiments, considerably more compact than prior art RLGs. In some embodiments, the RLG system of the invention combines three othogonal laser planes or triangles in one housing or block, for a significant savings in weight and size of such RLG system of the present invention.

SUMMARY OF THE INVENTION

Broadly, the present invention provides a lightweight RLG comprising:

a) a housing of LD aerogel, b) the housing having at least three passages therethrough which connect to define at least one triangle, which triangle is oriented so that the plane thereof is normal to an axis of the housing, c) a mirror mounted to the housing proximate each of two base corners of the triangle and a prism mounted to the housing proximate the apex thereof, d) laser beam generating means communicating with each such passage and e) means to actuate the generating means to generate oppositely directed laser beams in the passages which converge on the apex and project fringe patterns through the prism by which turning measurements of the housing can be taken.

In one embodiment of the invention, each passage of the triangle contains luminously conductive gas with an electrode mounted in the housing to communicate with each such passage and means means are provided to actuate the electrodes such that oppositely directed laser beams are generated in the passages In another embodiment of the invention the RLG housing has other passages cut therethrough to define two other such triangles with corresponding mirrors and prisms, gas and electrodes, the plane of each triangle being normal to one of the x, y and z axes of the housing respectively.

In yet another embodiment of the invention, the above luminous gas and electrodes are replaced with solid state laser diodes. each diode being mounted (in or near such passages) with a mirror/beamsplitter combination optic, as discussed below.

By "LD" aerogel as used herein, is meant aerogel having a density of from 600 to 100 mg/cc. The density is of course, less than half of the prior art ULE glass material which is typically 2200 mg/cc.

It is further noted that the mirrors employed in the RLG of the present invention can also be fabricated of the above LD aerogel material as more fully described in a copending application by the same inventor, entitled "Lightweight Aerogel Reflector," the disclosure of which is incorporated herein by reference.

BRIEF DESCRIPTION OF THE DRAWINGS

The invention will become more apparent from the following detailed specification and drawings in which.

DESCRIPTION OF PREFERRED EMBODIMENTS

Figure 1:
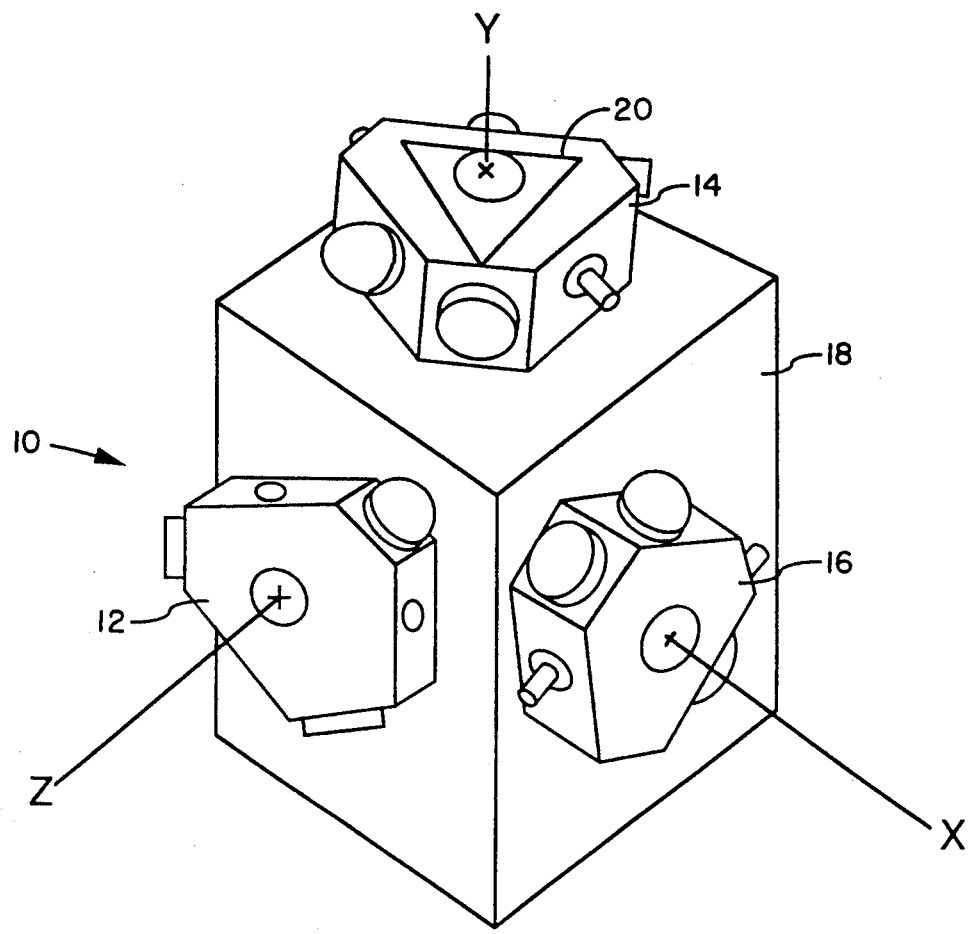
FIG. 1 is a perspective view of a prior art RLG apparatus.

In preparing the aerogel block for the RLG of the invention, one prepares, eg. an LD silica aerogel precursor block. The method of preparing such silica aerogel has recently been carried out by others and by itself does not define the novelty of the present invention. However, a summary of the preparation of an aerogel is herewith given. The preparation of such aerogel includes the hydrolysis and condensation of tetraethoxysilane (TEOS) and/or tetramethoxysilane (TMOS) to produce gels which are then supercritically extracted to a low density silicon glass network. This single-step solgel process has been used for several years in producing materials with densities ranging from 20 to 100 mg/cc. This method is suitable for preparing LD aerogels employed in the present invention However, such method requires high temperatures, eg. 400° C. and pressures, eg. 300 bars and certain precautions may be required.

The present invention employs an aerogel preferably made by a two-step extraction process. The two-step process differs from a conventional solgel process in that it generally proceeds at lower temperatures and pressures than the above one-step process and instead of requiring an extremely dilute solution to gel as in the single-step reaction, a partially hydrolyzed, partially condensed polysilicate mixture is prepared from which the alcohol is replaced as the solvent and then this non-alcoholic solvent is supercritically extracted.

That is, the solvent replacement technique employs liquid carbon dioxide, $CO_2$, to purge the system of the alcohols and then supercritically extracts the replacement solvent, ie. heats the system to a relatively low 40° C.,(and eg. 40 bars pressure) to drive off the $CO_2$. This leaves a very low density silicon dioxide network or aerogel, with densities ranging from 3 to 900 mg/cc.

In a more specific example, aerogel mirror substrates of the invention are fabricated using the above technology by first preparing a condensed silica oil by reacting TMOS with a sub-stoichiometric amount of water in methanol, under acidic conditions, with the following molar ratios:

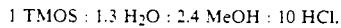
1 TMOS : 1.3 $H_2O$ : 2.4 MeOH : 10 HCl.

This mixture is then distilled, removing much of the methanol and leaving the silica oil (which includes the TMOS). The oil is then hydrolyzed:

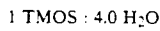
1 TMOS : 4.0 $H_2O$

This reaction is done in a pyrex glass mold in the presence of a non-alcoholic basic diluent ($NH_4OH$). Gel times vary from 12-72 hours. The silica aerogel is obtained from this "alcogel" by using liquid carbon dioxide to purge the alcogel of alcohol and replace it with such liquid carbon dioxide (which keeps the aerogel pores open). Thereafter heat is applied to raise the temperature of such aerogel to about 40° C., to apply supercritical triple point extraction ($CO_2$ phase diagram) to drive off such replacement solvent in the autoclave. The temperature is ramped (up to about 40° C.) while pressure is controlled and when finished, the autoclave (and the dried porous aerogel) is purged with dry nitrogen. The aerogel mirror substrate is then removed from the mold for polishing, coating and testing per the invention.

For more information on the above two-step extraction process or solvent replacement technique, in preparing aerogels, see an article by Laurence Hrubish and Thomas Tillotson in a book entitled "Better Ceramics through Chemistry Part IV," *Materials Research Society*, MRS Press, Pittsburgh, Pa., 1991, which article is incorporated herein by reference.

Thus to summarize, the aerogel starts as a sol, a colloidal suspension of solid particles in a liquid solvent. A catalyst is introduced to expedite gelation and after some aging time, the liquid is extracted from the gel. The liquid solvent is extracted in a two-step or solvent replacement method in which the solvent is replaced in the gel by a liquid having a lower critical temperature, e.g. liquid $CO_2$, followed by supercritical extraction of the $CO_2$ in a critical point, drying unit such as an autoclave.

Figure 2:
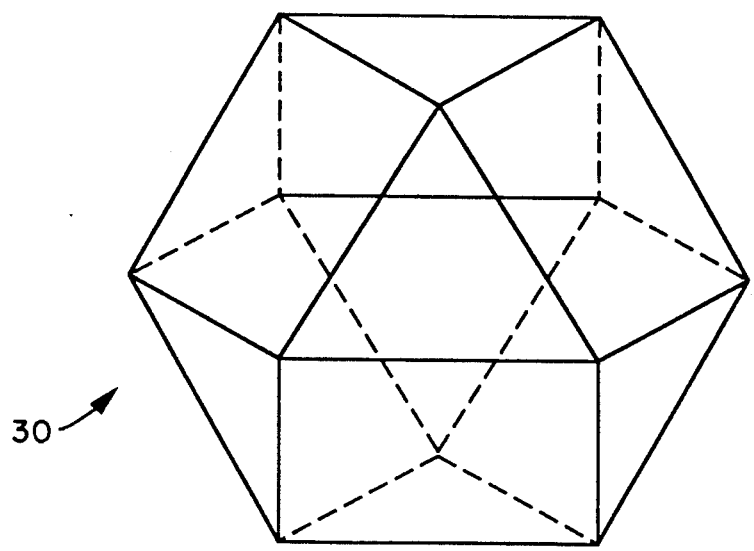
FIG. 2 is a perspective schematic view of a geometric figure.

A block of aerogel is formed per the above method, using a mold of the desired shape or such block can be cut off from a sheet or other shape of aerogel thus formed. The block can be cut to a desired shape and then machined as discussed below. Further as noted above, the block can be molded into a desired shape e.g. a cubic octahedron 30, as shown in FIG. 2. The block 30 has three orthogonal gyro input axes x, y and z inscribed within as shown in FIG. 3.

Figure 3:
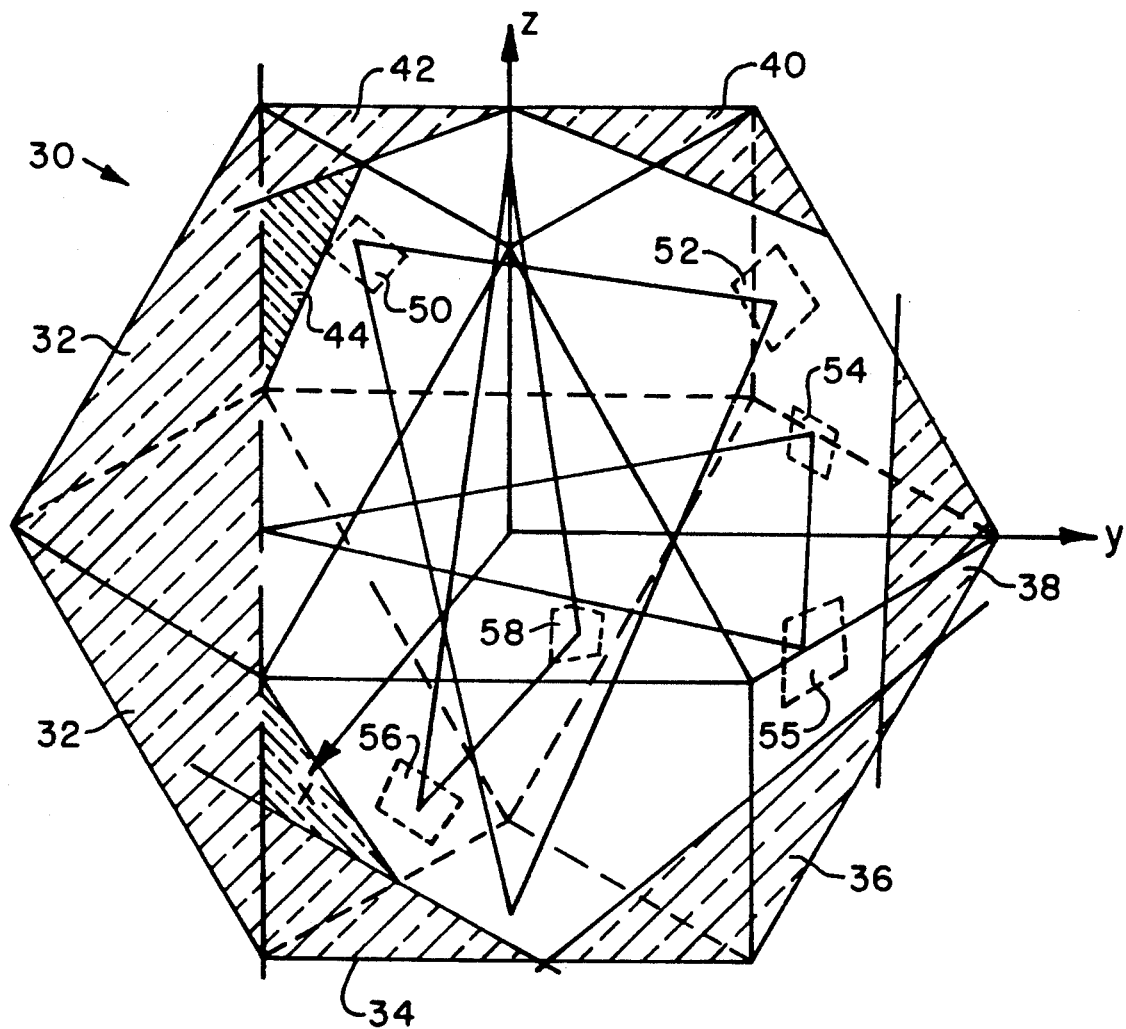
FIG. 3 is a perspective schematic view of an RLG of the invention in formation.

Such block 30 is then shaped to a derivative of a cubic octahedron as shown in FIG. 3, by cutting away the shaded areas therefrom 32, 34, 36, 38, 40, 42 and 44.

Thereafter, the RLG frame or housing of the invention is further fabricated using conventional glass machine tool techniques. That is, a block is drilled for gain and light paths or passages and mirrors, e.g. also fabricated from aerogel, are affixed to the so machined frame or block 30, at the locations 51 to 58 on the housing of RLG 60, shown in FIG. 4, as mirrors 61, 62, 64, 65, 66, and 68, per FIG. 4.

After fabricating the above RLG frame, a coating of, eg. $SiO_2$,.(eg. up to 2 mm thick or more) can (if desired) be applied to the exterior frame surfaces, eg. by chemical vapor deposition (CVD).

Figure 4:
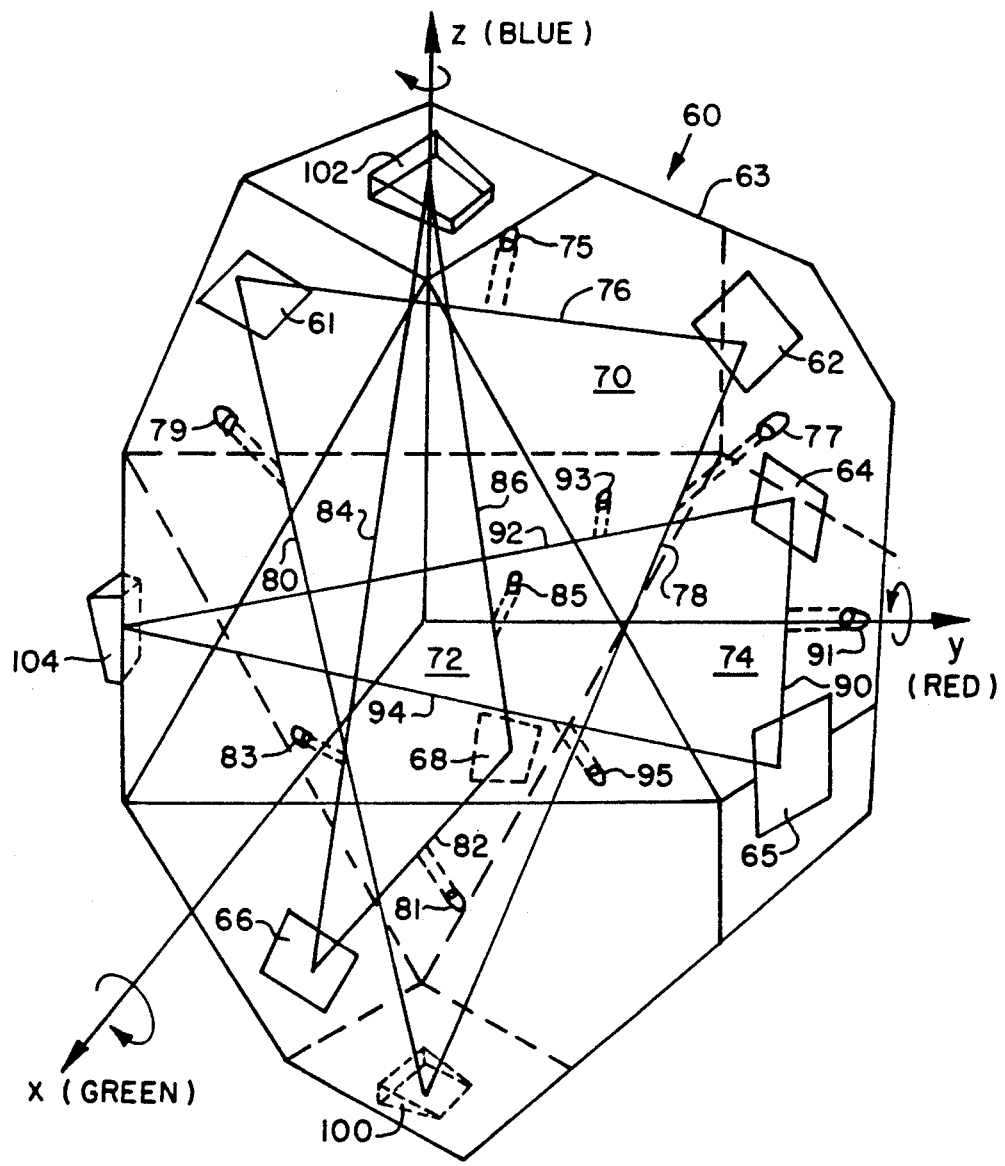
FIG. 4 is a perspective schematic view of an RLG (three-axes) embodying the present invention.

Within the housing 63 of the RLG of the invention 60, the light or laser paths define three orthogonal triangles 70, 72, and 74 as shown in FIG. 4. Triangle 70 has sides or laser passages 76, 78, and 80 and is normal to the x-axis per FIG. 4. Triangle 72 has laser passages 82, 84, and 86 and is normal to the y-axis per FIG. 4. And triangle 74 has laser passages 90, 92, and 94 and is normal to the z-axis per FIG. 4.

Heterodyning prisms 100, 102 and 104 are mounted to the housing 63 at the apexes of the above triangle 70, 72 and 74 respectively, as shown in FIG. 4.

Electrodes 75, 77, and 79 communicate with triangle 70 passages, 76, 78 and 80 respectively, per FIG. 4. Electrodes 81, 83 and 85 communicate with triangle 72 passages 82, 84 and 86 respectively, per FIG. 4. And electrodes 91, 93 and 95 communicate with triangle 74 passages 90, 92, and 94, as shown in FIG. 4.

A luminously conductive gas such as He/Ne is fed into the three laser triangles 70, 72 and 74 and the RLG 60 embodying the invention, is mounted on the body of, e.g. a spacecraft (not shown), to be monitored, as are beam-receiving detectors (not shown) for the three prisms 100, 102 and 104.

The RLG embodying invention, operates as follows. A spacecraft, e.g. a satellite is launched into orbit around the Earth. The RLG is activated by energizing the electrodes in the three laser triangles. The electrified He/Ne gas in the triangle passages generates a pair of oppositely directed laser beams in each triangle that converge on the apex thereof and project a series of fringe patterns through the respective prisms 100, 102, and 104 to external photo or light detectors (not shown). These detectors interpret such changing fringe patterns in terms of angular rotation of the satellite to which the RLG is attached to monitor its rotation and orientation in space, which fringe pattern detection and monitoring is well known in the art.

Figure 5:
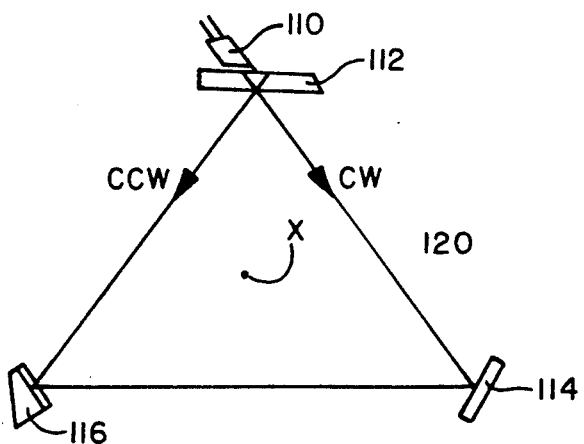
FIG. 5 is a schematic plan view of another RLG embodiment (single axis) of the invention and FIG. 6 is a perspective schematic view of an RLG embodiment (three-axes) of the invention derrived from the embodiment of FIG. 5.
Figure 6:
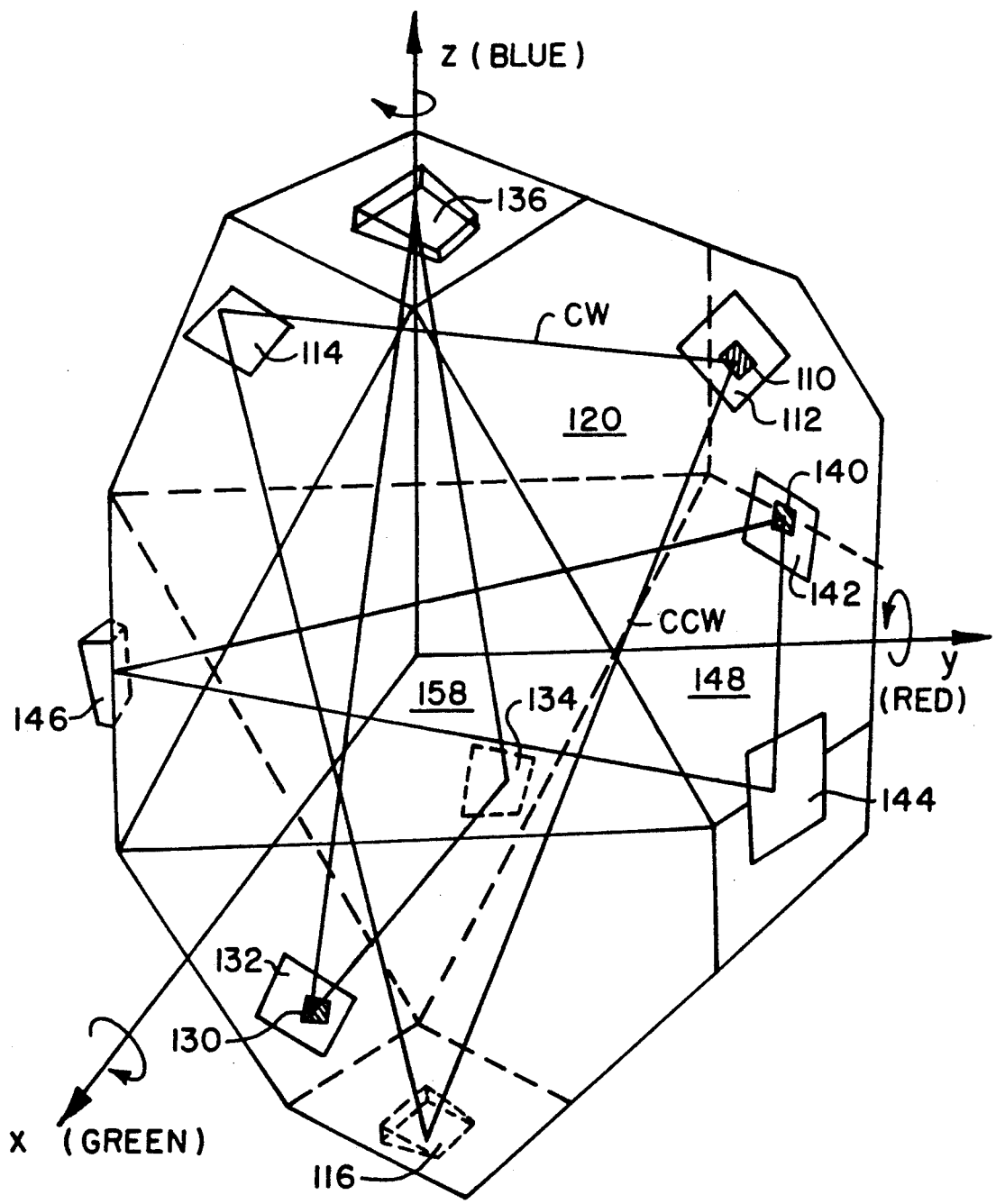

In another embodiment of the invention, the luminously conductive gas (laser plasma) and electrodes are replaced by solid state laser diodes and mirror/beamsplitter combinations. Thus as shown in FIG. 5, laser diode 110 with mirror/beamsplitter optic 112 in combination with mirror 114 and output prism 116, projects a beam of light in the CW direction, as shown in FIGS. 5 and 6. The optic 112 splits the laser beam into two beams, clockwise directed, CW and counterclockwise directed, CCW, as shown or indicated in FIGS. 5 and 6.

Thus as in the luminous gas embodiment described above, a pair of oppositely directed laser beams are directed around the laser triangle 120, which beams converge on the apex thereof and project a series of fringe patterns through the output prism 116 to external detectors (not shown), as indicated in FIGS. 5 and 6 and discussed above with respect to the luminous gas embodiment of FIG. 4.

Referring back to the laser triangle 120 of FIG. 5, the output axis x is perpendicular to the plane of such triangle and to the drawing sheet thereof.

This embodiment of the invention incorporates the single-axis RLG triangle 120 of FIG. 5 into the three-axes embodiment shown in FIG. 6, which shows two other laser triangles, triangle 138, having laser diode 130 with mirror/beamsplitter optic 132, mirror 134 and output prism 136 and triangle 148, having laser diode 140 with mirror/beamsplitter optic 142, mirror 144 and output prism 146, as shown in FIG. 6.

Thus the laser diode embodiment of FIG. 6 generates a pair of oppositely directed laser beams in each triangle to project a series of fringe patterns through the respective three output prisms 116, 136 and 146, in the manner of the luminous gas embodiment shown in FIG. 5. However the embodiment of FIG. 6, not requiring luminous conductive gas nor electrodes, is of even less weight than its FIG. 5 counterpart and requires a lesser voltage power supply for operation thereof.

The novelty of the invention is not in the use of a single laser triangle nor the projection of fringe patterns through a prism onto a detector for monitoring the rotation thereof. The novelty of the invention is twofold:

a) The use of LD aerogel as a lightweight housing or frame for such RLG of the present invention with or without LD mirrors mounted on such housing and/or b) installing three orthogonal laser triangles in the same block or housing, a much more compact design than that of the prior art, which teaches three (relatively heavy) ULE glass blocks, one for each of three laser triangles, which blocks are mounted orthogonally on three sides of a larger housing as shown in FIG. 1. Accordingly, the RLG of the invention is considerably lighter and more compact than RLGs of the prior art. Further, when the RLG of the invention is combined with accelerometers, this three axis RLG provides a small, lightweight, inertial sensor assembly which may be directly applied to navigation, guidance and control systems.

The aerogel housing of the RLG of the present invention can be made from inorganic aerogels e.g. $SiO_2$, $SiO_3$, SiC, KCl and $Be_2O_3$. Such housing can also be made of LD organic aerogels (in the presence of a catalyst) to obtain aerogels of, e.g. resorcinol-formaldehyde and melamine-formaldehyde.

Various other inorganic and organic aerogels can be employed as the RLG housing (and mirror substrates) of the present invention. A preferred such aerogel is an LD silica aerogel.

The aerogel employed herein, can have a density of from 600 to 1000 mg/cc. However, for RLG housing applications, it is preferred to employ aerogels having densities between 600 to 800 mg/cc.

What is claimed is:

1. A lightweight RLG comprising:
   a) a housing of LD aerogel,
   b) said housing having at least three passages therethrough which connect to define at least one triangle, which triangle is oriented so that the plane thereof is normal to an axis of said housing;
   c) a mirror mounted to said housing proximate each of two base corners of said triangle and a prism mounted to said housing proximate the apex thereof;
   d) each passage of said triangle containing luminously conductive gas with an electrode mounted in said housing to communicate with each such passage and
   e) means to actuate said electrodes such that oppositely directed laser beams are generated in said passages which converge on said apex and fringe patterns are projected through said prism by which turning measurements of said housing can be taken.

2. The RLG of claim 1 wherein said housing has other passages cut therethrough to define at least two separate other such triangles with corresponding mirrors and prisms, gas and electrodes, the plane of each triangle being normal to one of the x, y and z axes of said housing respectively.

3. The RLG of claim 2, mounted on a vehicle, wherein light detectors are also mounted on said vehicle outside of said housing in the light path of said prisms for reading the fringe patterns of each laser triangle to measure the turning angle of such housing on the x, y and z axes.

4. The RLG of claim 1 wherein said housing is of silica aerogel at densities of between 600 to 1000 mg/cc.

5. The RLG of claim 1 wherein said housing is derived or cut from a cubic octahedron.

6. The RLG of claim 2 wherein said laser triangles are formed by drilling passages in said housing which define such triangles.

7. The RLG of claim 1 wherein said mirrors have substrates of LD aerogel.

8. The RLG of claim 1 attached to a space vehicle.

9. The RLG of claim 1 wherein oppositely directed laser beams are generated in said passages which converge on said apex to project said fringe patterns through said prism.

10. The RLG of claim 1 wherein said housing is of organic or inorganic LD aerogel.

11. The RLG of claim 10 wherein said inorganic aerogel is selected from a group consisting of $SiO_2$, $SiO_3$, SiC, KCl and $Be_2O_3$ and said organic aerogel is selected from the group consisting of resorcinol formaldehyde and melamine formaldehyde.

12. The RLG of claim 1 wherein said housing has an $SiO_2$ coating applied to the exterior surfaces thereof.

13. A lightweight RLG comprising:
   a) a housing of LD aerogel,
   b) the housing having at least three passages therethrough which connect to define at least one triangle, which triangle is oriented so that the plane thereof is normal to an axis of the housing,
   c) a mirror mounted to the housing proximate each of two base corners of the triangle and a prism mounted to the housing proximate the apex thereof,
   d) laser beam generating means communicating with each such passage and e) means to actuate said generating means to generate oppositely directed laser beams in the passages which converge on the apex and project fringe patterns through said prism by which turning measurements of the housing can be taken.

14. The RLG of claim 13 wherein one of said mirrors is a mirror/beamsplitter combination optic with a laser diode mounted therebehind and means to actuate said laser diode to generate oppositely directed laser beams in the passages which converge on the apex and project fringe patterns through said prism by which turning measurements of the housing can be taken.

15. The RLG of claim 14 wherein said housing has other passages cut therethrough to define at least two separate other such triangles with corresponding mirrors, mirror/beamsplitter optics, laser diodes and prisms, the plane of each triangle being normal to one of the x, y and z axes of said housing respectively.

* * * * *